US011648976B2

(12) United States Patent
Aradhyula et al.

(10) Patent No.: US 11,648,976 B2
(45) Date of Patent: May 16, 2023

(54) REMOTE CONTROL SYSTEM FOR A VEHICLE AND TRAILER

(71) Applicant: Ford Global Technologies, LLC, Dearborn, MI (US)

(72) Inventors: Hemanth Yadav Aradhyula, Farmington Hills, MI (US); Erick Lavoie, Van Buren Charter Township, MI (US); Bo Bao, Bloomfield, MI (US); Seyed Armin Raeis Hosseiny, Canton, MI (US); Siyuan Ma, Detroit, MI (US); Monica Bannurkar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 17/149,087

(22) Filed: Jan. 14, 2021

(65) Prior Publication Data

US 2022/0219751 A1   Jul. 14, 2022

(51) Int. Cl.
*B62D 1/28*    (2006.01)
*G05D 1/02*    (2020.01)
*B62D 13/06*   (2006.01)

(52) U.S. Cl.
CPC ............ *B62D 1/28* (2013.01); *G05D 1/0212* (2013.01); *G05D 1/0285* (2013.01); *B62D 13/06* (2013.01)

(58) Field of Classification Search
CPC ...... B62D 1/28; B62D 13/06; B62D 15/0285; B62D 1/00; G05D 1/0212; G05D 1/0285; G05D 2201/0213; G05D 1/0016; G05D 1/0033; G05D 1/024; G05D 1/0214; G05D 1/0278; G05D 2201/02
See application file for complete search history.

(56) References Cited

U.S. PATENT DOCUMENTS

| | | | |
|---|---|---|---|
| 8,779,848 B2 | 7/2014 | Pickett et al. | |
| 2016/0257341 A1* | 9/2016 | Lavoie | B60W 30/18036 |
| 2017/0008563 A1* | 1/2017 | Popken | B62D 15/0285 |
| 2017/0029024 A1* | 2/2017 | Lavoie | B62D 13/06 |
| 2017/0080974 A1* | 3/2017 | Lavoie | B62D 13/06 |
| 2017/0113722 A1* | 4/2017 | Lavoie | B62D 6/002 |
| 2019/0064828 A1* | 2/2019 | Meredith | G05D 1/0242 |
| 2019/0235504 A1* | 8/2019 | Carter | G06T 7/73 |
| 2020/0097001 A1* | 3/2020 | Lavoie | G06F 3/04845 |
| 2021/0174685 A1* | 6/2021 | Agarwal | G16Y 40/10 |
| 2021/0269092 A1* | 9/2021 | Golgiri | B60D 1/62 |
| 2021/0347410 A1* | 11/2021 | Niewiadomski | B62D 15/021 |
| 2022/0004183 A1* | 1/2022 | Raeis Hosseiny | B62D 15/0285 |

OTHER PUBLICATIONS

Instructables Circuits, "Automated Trailer Monitoring System", ACEautomation, 2020 Autodesk, Inc., 13 pages.

* cited by examiner

*Primary Examiner* — Mussa A Shaawat
(74) *Attorney, Agent, or Firm* — Frank Lollo; Eversheds Sutherland (US) LLP

(57) ABSTRACT

The disclosure describes systems and methods including a mobile device for remotely controlling the movement of a vehicle and trailer. The mobile device provides an intuitive user interface and control input mechanism for controlling the movement of the vehicle and trailer. The control input mechanism uses the tilt and heading of the mobile device to provide a propulsion command and a steering curvature command.

20 Claims, 7 Drawing Sheets

REMOTE CONTROL SYSTEM FOR A VEHICLE AND TRAILER

BACKGROUND

Operating a vehicle with a trailer in tow can be very challenging for many drivers. This is particularly true for drivers that are unskilled at backing up vehicles with attached trailers. Such drivers may include those that drive with a trailer on an infrequent basis (e.g., drivers that rent a trailer). For example, when manually reversing a trailer, the direction of the steering wheel input may be counterintuitive to the resulting trailer direction. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
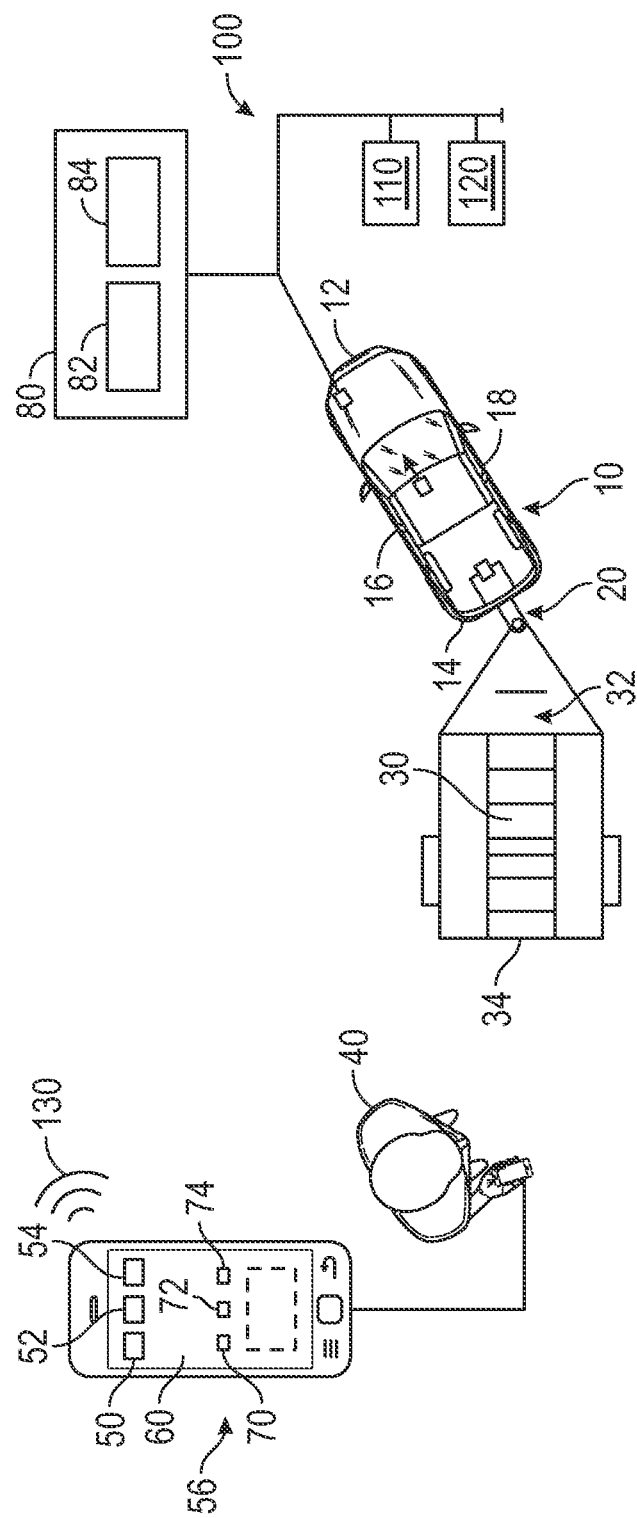
FIG. 1 depicts a vehicle, a trailer, and a mobile device of a vehicle control system for controlling the vehicle in accordance with the present disclosure.

The systems and methods disclosed herein are configured to provide a mobile device for remotely controlling the movement of a vehicle and trailer. The mobile device provides an intuitive user interface and control input mechanism for controlling the movement of the vehicle and trailer. The control input mechanism uses the tilt and heading of the mobile device to provide a propulsion command and a steering curvature.

The control input mechanism is customized to a user by setting a tilt angle as an initialization tilt angle and setting a heading as an initialization heading with the mobile device. The initialization tilt angle may be limited to a certain range of tilt angles to allow for sufficiently large propulsion control input sectors within the maximum range of tilt angles for a user.

Propulsion control input sectors are defined relative to the initialization tilt angle and steering control input sectors are defined relative to the initialization heading. The propulsion control input sectors are configured to generate a control signal for controlling a movement of the vehicle in a direction if the tilt angle of the mobile device is in the propulsion control input sector. The steering control input sectors are configured to generate a control signal for controlling a curvature of a path of the vehicle if the heading of the mobile device is in the curvature control input sector.

A user interface of the mobile device displays a vehicle graphic, a forward path graphic, and a reverse path graphic. The forward path graphic is positioned at a front end of the vehicle graphic and displays a path extending in a forward direction from the vehicle graphic. The reverse path graphic is positioned at a rear end of the vehicle graphic and displays a path extending in a reverse direction from the vehicle graphic.

The shape of the path represents the steering wheel angle of the vehicle as a function of distance or location along a path. The shape of the path can be changed by the changing the steering control input sector in which the heading is located. The direction of movement can be changed by changing the propulsion control input sector in which the tilt angle is located.

The mobile device displays control graphics on the user interface depending on which propulsion control input sector the tilt angle is located and depending on which steering control input sector the heading is located. For example, if the tilt angle of the mobile device is in a reverse control input sector, the control graphic includes highlighting or coloring the area behind the vehicle graphic and the reverse path graphic. If the heading is in the left-curvature control sector, the control graphic includes showing the reverse path graphic with curvature to the left and highlighting or coloring the path graphic based on the amount of curvature.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 illustrates a vehicle 10. The vehicle 10 includes a front end 12, a back end 14, a left side 16 (e.g., a driver side), and a right side 18 (e.g., a passenger side). The vehicle 10 includes a hitch 20. The hitch 20 (also referred to as a tow hitch, a tow bar, a trailer hitch, etc.) is located at the back end 14 of the vehicle 10. For example, the hitch 20 is coupled to and extends from a chassis of the vehicle 10.

Although illustrated as a truck, the vehicle 10 may take the form of another passenger or commercial automobile such as, for example, a car, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 10 may be configured as an electric vehicle (EV). More particularly, the vehicle 10 may include a battery EV (BEV) drive system. The vehicle 10 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 10 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 10 may be a manually driven vehicle, and/or be configured to operate in a fully autonomous (e.g., driverless) mode (e.g., level 5 autonomy) or in one or more partial autonomy modes. Examples of partial autonomy modes are widely understood in the art as autonomy Levels 1 through 5.

An autonomous vehicle (AV) having Level 1 autonomy may generally include a single automated driver assistance feature, such as steering or acceleration assistance. Adaptive cruise control is one such example of a Level 1 autonomous system that includes aspects of both acceleration and steering.

Level 2 autonomy in vehicles may provide partial automation of steering and acceleration functionality, where the automated system(s) are supervised by a human driver that performs non-automated operations such as braking and other controls.

Level 3 autonomy in a vehicle can generally provide conditional automation and control of driving features. For example, Level 3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task.

Level 4 autonomy includes vehicles having high levels of autonomy that can operate independently from a human driver, but still include human controls for override operation. Level 4 automation may also enable a self-driving mode to intervene responsive to a predefined conditional trigger, such as a road hazard or a system failure.

Level 5 autonomy is associated with autonomous vehicle systems that require no human input for operation, and generally do not include human operational driving controls.

A trailer 30 includes a front end 32 and a back end 34. Trailers are utilized for various purposes including hauling objects (e.g., other vehicles), moving, and camping.

The trailer 30 is coupled to the vehicle 10 via the hitch 20 such that the vehicle 10 is able to pull or push the trailer 30 from one location to another location. The hitch 20 is configured to receive a trailer connector (as illustrated, located at the front end 32) of the trailer 30 to couple the trailer 30 to the vehicle 10.

The hitch 20 allows the trailer 30 to rotate. The trailer 30 follows the path of the vehicle 10 when the vehicle 10 moves forward. The path of the trailer 30 when the vehicle 10 moves in reverse depends on the direction of force (e.g., due to steering angle) applied by the vehicle 10 at the hitch 20. If the longitudinal axes of the vehicle 10 and trailer 30 are aligned through the hitch 20, the reverse path is straight. If the longitudinal axis of the vehicle 10 and the longitudinal axis of the trailer 30 are at an angle, the reverse path is has a curved shape.

The movement of the vehicle 10 and trailer 30 may be remotely controlled by a user 40 using a mobile device 50 according to systems and methods described in further detail below. The mobile device 50 generally includes a memory 52 and a processor 54. The memory 52 stores an application 56 including program instructions that, when executed by the mobile device processor 54, performs aspects of the disclosed embodiments. The application 56 may be part of a vehicle control system described below or may provide and or receive information from the vehicle control system.

The mobile device 50 further includes a user interface 60 and sensors including an accelerometer 70, a gyroscope 72, and a magnetometer 74 (e.g., compass sensor).

The vehicle 10 includes an automotive computer 80. The automotive computer 80 may be or include an electronic vehicle controller. The automotive computer 80 may be installed in an engine compartment of the vehicle 10 as schematically illustrated or elsewhere in the vehicle 10. The automotive computer 80 may operate as part of a vehicle control system described in further detail below.

The automotive computer 80 may include a computer-readable memory 82 one or more processor(s) 84. The one or more processor(s) 84 may be disposed in communication with one or more memory devices disposed in communication with the respective computing systems (e.g., the memory 82 and/or one or more external databases not shown in FIG. 1). The processor(s) 84 may utilize the memory 82 to store programs in code and/or to store data for performing aspects of methods in accordance with the disclosure.

The memory 82 may be a non-transitory computer-readable memory storing program code. The memory 82 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

Figure 11:
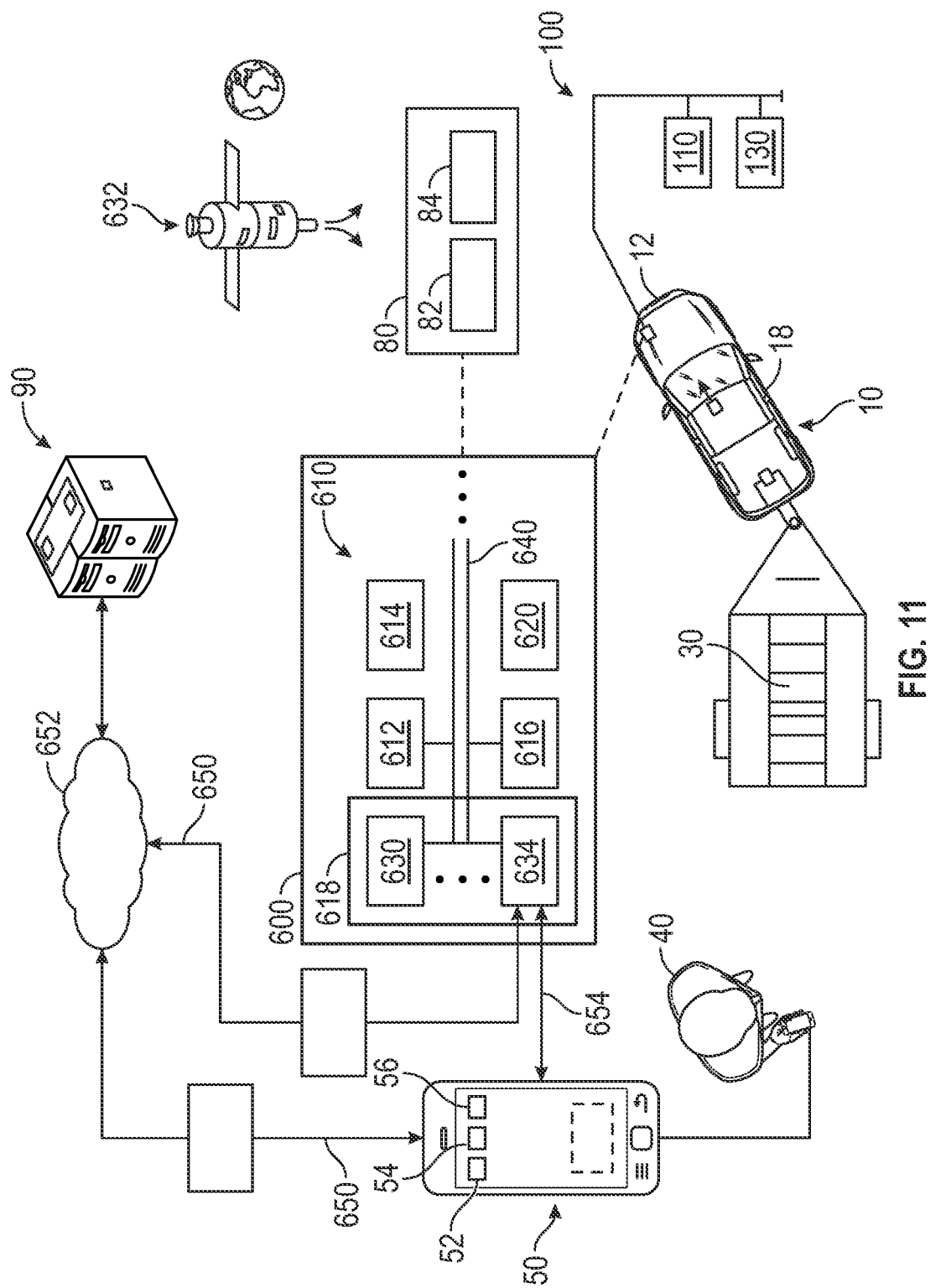
FIG. 11 depicts a vehicle, a trailer, and an example functional schematic of a vehicle control system for controlling the vehicle with a mobile device in accordance with the present disclosure.

The automotive computer 80 may, in some example embodiments, be disposed in communication with the mobile device 50 and one or more server(s) 90 (shown in FIG. 11).

FIG. 1 illustrates an example functional schematic of the vehicle control system 100 of the vehicle 10 including some elements described above. The vehicle control system 100 can include a vehicle system controller 110 and vehicle sensors 120; and the mobile device 50 with the application 56, the user interface 60 (e.g., a touch-sensitive display screen), and the sensors 70, 72, 74.

The vehicle system controller 110 may be configured or programmed to control one or more vehicle subsystems. Examples of subsystems that may be controlled by the vehicle system controller 110 may include one or more systems for controlling braking, ignition, steering, acceleration, transmission control, and/or other control mechanisms. Vehicle systems are described in greater detail with respect to FIG. 11.

The vehicle system controller 110 may control the subsystems based, at least in part, on signals generated by the vehicle sensors 120 and the mobile device 50 (e.g., a control signal 130). The mobile device 50 may also provide data transfer functions of the system 100.

The vehicle sensors 120 may include autonomous driving sensors, which include any number of devices configured or programmed to generate signals that help navigate the vehicle 10 while the vehicle 10 is operating in the autonomous (e.g., driverless) mode. Examples of autonomous driving sensors include a Radio Detection and Ranging (RADAR or "radar") sensor configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The mobile device 50 may be configured or programmed to present information to the user 40 via the user interface 60 during operation of the vehicle 10. The mobile device 50 may also be configured or programmed to receive inputs from the user 40 via the user interface 60 to operate the vehicle 10. The mobile device 50 can be used to control the vehicle 10 at various locations or positions outside and around the periphery of the vehicle 10.

Figure 2:
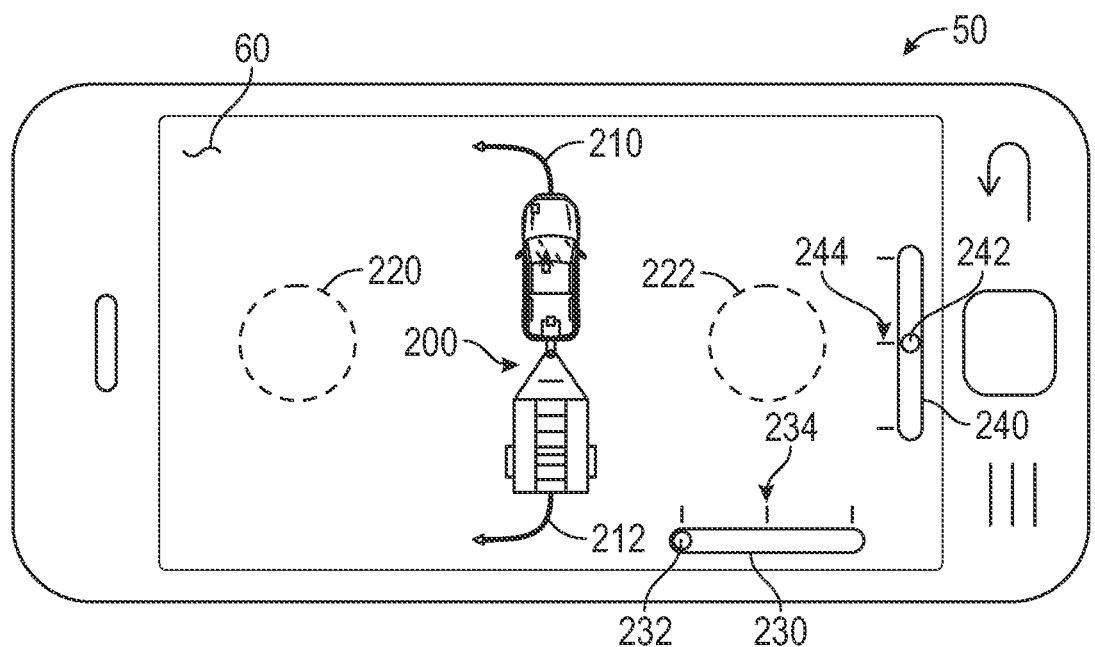
FIG. 2 is a schematic illustration of the mobile device of FIG. 1 with a user interface displaying a graphic of a vehicle and trailer in accordance with the present disclosure.

Referring to FIG. 2, the mobile device 50 displays a vehicle graphic 200 that represents the vehicle 10 and the trailer 30. The mobile device 50 also displays path graphics 210, 212 that extend from the vehicle graphic 200. The path graphics 210, 212 represent controlled movement of the vehicle 10 and trailer 30 along a path in one of a forward direction (e.g., forward path graphic 210 aligned with a front end of vehicle graphic 200) and a reverse direction (e.g., reverse path graphic 212 aligned with a back end of vehicle graphic 200) from a first location to a second location.

The forward path graphic 210 represents a controlled forward path of the vehicle 10 and trailer 30 moving in a forward direction, for example, when using a forward control input described in further detail below. The forward path graphic 210 may be straight or may be have a curved shape.

The curved shape of the forward path graphic 210 is based on the angle of the steering wheel of the vehicle 10 as the vehicle 10 moves forward along the path. The angle of the steering wheel may change at certain locations along the path to achieve a curved shape. As such, the curved shape of the forward path graphic 210 may be associated with various steering wheel angles that are a function of distance or location along a forward path to control the vehicle 10 and trailer 30 along a curved path.

The reverse path graphic 212 represents a controlled reverse path of the vehicle 10 and trailer 30 moving in a reverse direction, for example, when using a reverse control input described in further detail below. The reverse path graphic 212 may be straight or may be have a curved shape.

The curved shape of the reverse path is based on the angle of the steering wheel of the vehicle 10 as the vehicle 10 moves in reverse along the path. The angle of the steering wheel may change at certain locations along the path to achieve a curved shape. As such, the curved shape of the reverse path 212 may be associated with various steering wheel angles that are a function of distance along the reverse path to control the vehicle 10 and trailer 30 along a curved path.

The mobile device 50 may generate and display two engagement areas 220, 222 on the user interface 60. The engagement areas 220, 222 are engaged by the user 40. For example, the user 40 holds the mobile device 50 with both hands and contacts the two engagement areas 220, 222 with the user's thumbs. When the user 40 contacts both of the engagement areas 220, 222, the mobile device 50 is able to perform methods described in further detail below.

In some examples, the mobile device 50 may display a path input 230 with which the curvature of the path (i.e., path graphics 210, 212) can be controlled. The shape of the path graphics 210, 212 may be determined and displayed as a function of the position of a path input 230 of the mobile device 50.

The path graphics 210, 212 of FIG. 2 curve up and to the left and curve down and to the left to varying degrees when a setting 232 of the path input 230 is moved left of a center position 234. Similarly, the illustrated path graphics 210, 212 curve up and to the right and curve down and to the right to varying degrees when the setting 232 of the path input 230 is moved right of the center position 234. The path graphics 210, 212 are straight when the setting 232 of the path input 230 is at the center position 234.

The vehicle 10 may steer the roadwheels in response to receiving a curvature command input (e.g., the setting 232 of the path input 230) before implementing a propulsion command in order to prepare the vehicle 10 to begin following the desired curvature once vehicle propulsion begins. As described in further detail below with respect to FIG. 8, the vehicle 10 may steer the roadwheels to achieve a selected curvature in response to a curvature command input and direction of propulsion when the tilt angle 260 is between the initialization tilt angle 332 and the neutral border angle 344, 345 corresponding to the direction of propulsion. Similarly, the vehicle 10 may steer the roadwheels to achieve a selected curvature in response to a curvature command input and direction of propulsion before implementing a propulsion command (e.g., via the engagement areas 220, 222).

The path input 230 is illustrated in FIG. 2 as a slide input but may alternatively be another type of input such as a dial input.

The path input 230 may be used to adjust a variable of a curvature function that changes the curvature of the path graphics 210, 212. The path input 230 may be used to scroll through different possible path graphics 210, 212 with different shapes that may be achieved with predetermined control instructions for controlling the steering angle based on distance along the path. In the reverse direction, the possible paths may depend on the initial angle between the vehicle 10 and the trailer 30.

The mobile device 50 may display a direction input 240 with which the direction of movement can be controlled. One of the path graphics 210, 212 may be determined and displayed as a function of the position of a direction input 240 of the mobile device 50.

The control input is set to forward (e.g., path graphics 210) when a setting 242 of the direction input 240 is moved up from of a center position 244. The control input is set to reverse (e.g., path graphics 212) when the setting 242 of the direction input 240 is moved down from of the center position 244. The control input is set to neutral or park when the setting 242 of the direction input 240 is at the center position 244.

The direction input 240 is illustrated in FIG. 2 as a slide input but may alternatively be another type of input such as a dial input.

The mobile device 50 uses measurements of tilt and rotation of the mobile device 50 as propulsion command and steering curvature control inputs that are used to generate control signals 130. The vehicle system controller 110 may receive control signals 130 from the mobile device 50, and maneuver the vehicle 10 according to the control signals 130 to move the trailer 30.

Figure 3:
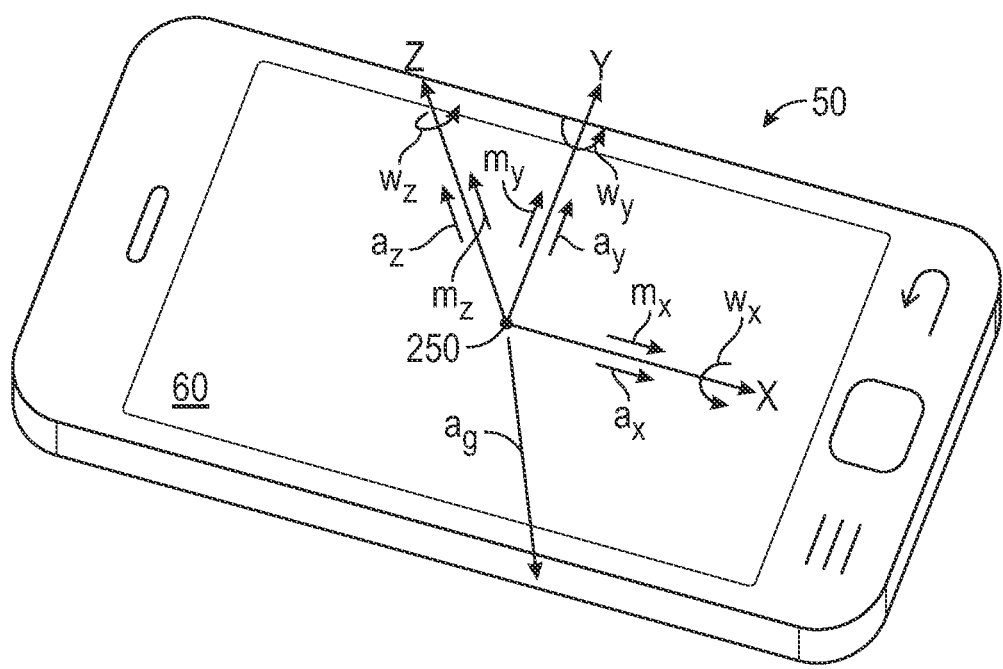
FIG. 3 is a schematic illustration of a perspective view of the mobile device of FIG. 2 in accordance with the present disclosure.

Referring to FIG. 3, an x-axis, y-axis, and z-axis may be defined with respect to the mobile device 50. Here, as the geometry of the mobile device 50 is rectangular, the x-axis aligns with a longitudinal horizontal dimension of the mobile device 50 and the y-axis aligns with a lateral vertical dimension of the mobile device 50. The x-axis and the y-axis define an x-y plane that is parallel, for example, to the surface of the user interface 60 of the mobile device 50. The z-axis is orthogonal to the x-y plane.

As mentioned above, the mobile device 50 includes inertial sensors such as an accelerometer 70, a gyroscope 72, and a magnetometer 74. The inertial sensors are represented by an origin 250 of the axes.

The accelerometer 70 measures linear acceleration and the acceleration of gravity (ag). In particular, the accelerometer measures components of the overall acceleration along the x-axis, y-axis, and z-axis (e.g., ax, ay, az).

The gyroscope 72 measures angular velocity. In particular, the gyroscope measures angular velocity around each of the x-axis, y-axis, and z-axis (e.g., wx, wy, wz).

The magnetometer 74 measures earth's magnetic fields and provides a heading. In particular, the magnetometer measures components of the overall magnetic field along the x-axis, y-axis, and z-axis (e.g., mx, my, mz).

Figure 4:
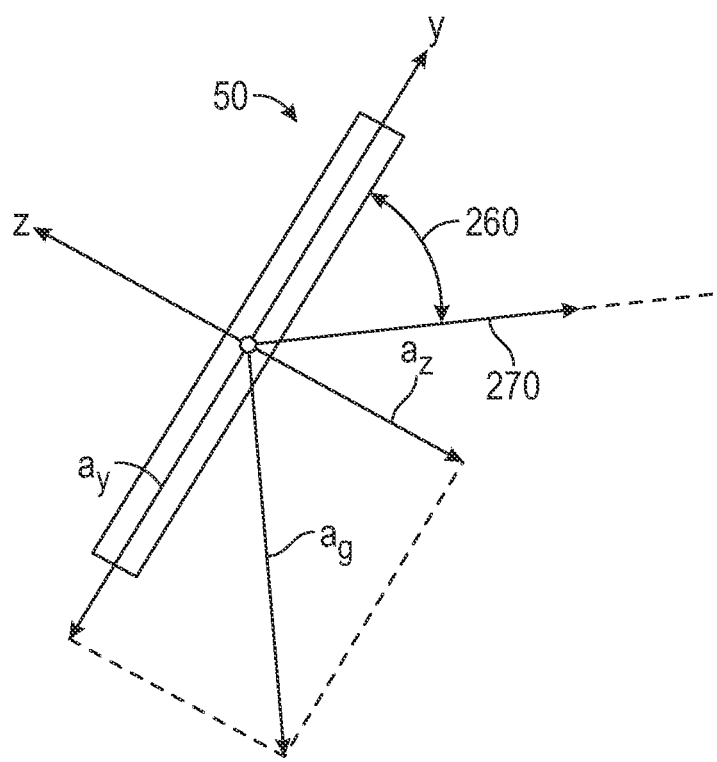
FIG. 4 is a schematic illustration of an end view the mobile device of FIG. 2 illustrating a tilt angle in accordance with the present disclosure.

Referring to FIG. 4, tilt of the mobile device 50 is associated with rotation about the x-axis. Referring to FIG. 4, the tilt angle can be defined as an angle between the x-y plane and a horizontal plane described in further below. The tilt angle can be determined using one or more of the inertial sensors.

A tilt angle 260 may be determined using the measurements of the accelerometer 70 and/or the gyroscope 72. The measurements of the accelerometer 70 and the gyroscope 72 can be used alone or can be combined (e.g., "sensor fusion"), for example, with a filter such as a Kalman filter.

When the mobile device 50 is at rest, the tilt angle 260 can be determined based on an angle defined by the acceleration measurements along the y-axis and z-axis (ay, az). For example, if the x-y plane when horizontal has a tilt angle of zero, the tilt angle 260 can be based on tan-1(ay/az), cos-1(ay/ag), sin-1(az/ag), where ag is the magnitude of the measurement of the acceleration of gravity by the accelerometer 70. The tilt angle 260 can also be calculated by integrating a measurement of the angular velocity around the x-axis (wx).

A heading 270 of the mobile device 50 is associated with rotation about the y-axis. The heading 270 can be determined using one or more inertial sensors. Referring to FIG. 4 the heading 270 may be determined using measurements of the magnetometer 74 and/or the gyroscope 72. The measurements of the magnetometer 74 and the gyroscope 72 can be used alone or combined (e.g., "sensor fusion"), for example, with a filter such as a Kalman filter. When the mobile device 50 is at rest, the heading 270 can be determined based the magnetic field measurements (mx, my, mz). The heading 270 can also be predicted by integrating a measurement of the angular velocity around the y-axis (wy).

Figure 5:
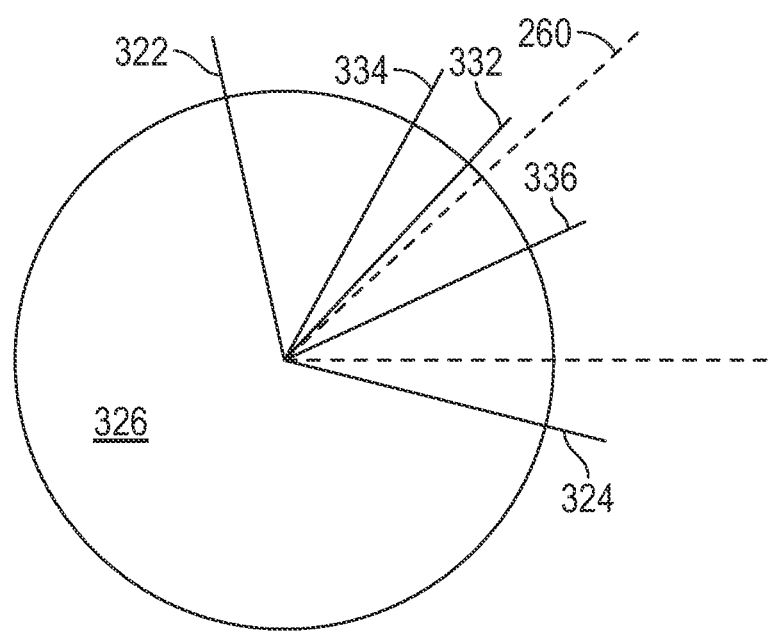
FIG. 5 is schematic illustration of a coordinate system and the tilt angle of FIG. 4 in accordance with the present disclosure.

Referring to FIG. 5, the tilt angle 260 is shown on a radial coordinate system where zero degrees aligns with a horizontal plane (e.g., orthogonal to the direction of gravitational acceleration).

Figure 6:
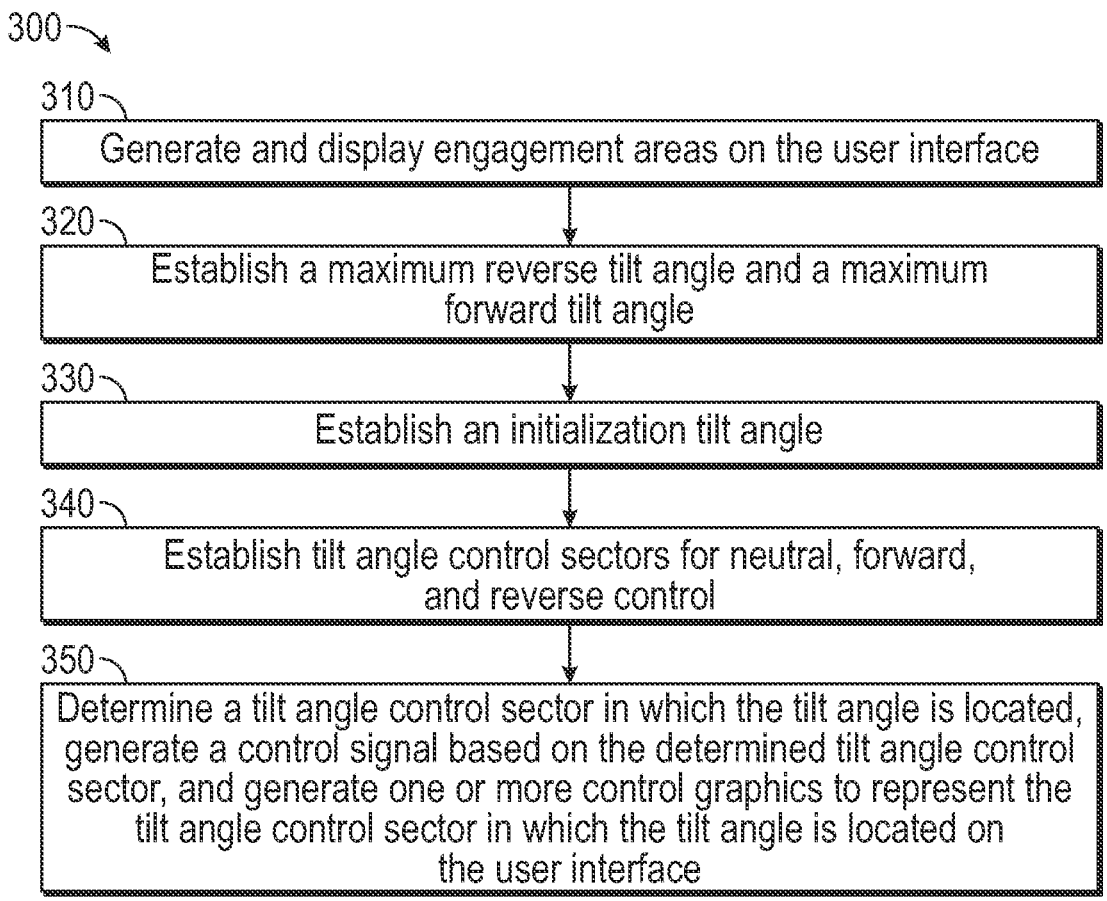
FIG. 6 is a flow chart of an example method in accordance with the present disclosure.

Referring to FIGS. 5 and 6, according to a method 300, the mobile device 50 may generate propulsion command control inputs that are customized for the user 40. According to a first step 310, referring momentarily to FIG. 2, the mobile device 50 may generate and display two engagement areas 220, 222 on the user interface 60 and the engagement areas 220, 222 are engaged by the user 40. For example, the user 40 holds the mobile device 50 with both hands and contacts the engagement areas 220, 222 with the user's thumbs. When the user 40 contacts both of the engagement areas 220, 222, the mobile device 50 continues with additional steps of the method 300.

In some examples, according to a second step 320, the mobile device 50 prompts the user 40 to establish a maximum reverse tilt angle 322 and a maximum forward tilt angle 324. For example, the mobile device 50 prompts the user 40 to rotate the mobile device 50 in a reverse direction (counterclockwise in FIG. 5) around the x-axis as far as possible or as far as is comfortable to establish the maximum reverse tilt angle 322. The mobile device 50 prompts the user 40 to rotate the mobile device 50 in a forward direction (clockwise in FIG. 5) around the x-axis as far as possible or as far as is comfortable to establish the maximum forward tilt angle 324. In other examples, the maximum reverse tilt angle 322 and the maximum forward tilt angle 324 are predetermined.

An inactive sector 326 may be defined between the maximum reverse tilt angle 322 and the maximum forward tilt angle 324.

According to a third step 330, the mobile device 50 prompts the user 40 to establish an initialization tilt angle 332. The initialization tilt angle 332 is a tilt angle that is a neutral control position where neither a forward or reverse control command is generated. The initialization tilt angle 332 may be established at a tilt angle that is comfortable to a particular user 40.

The initialization tilt angle 332 can be limited to a range of initialization tilt angles (e.g., an initialization zone or sector as defined by an reverse initialization tilt angle limit 334 and a forward initialization tilt angle limit 336) so as to leave at least a threshold amount of forward tilt and reverse tilt motion on each side of the initialization tilt angle 332. Thereby, sufficiently large forward and reverse control sectors, described below, can be defined on each side of the initialization tilt angle 332 and the user 40 is able to comfortably control the vehicle 10 in both forward and reverse directions.

The reverse initialization tilt angle limit 334 and the forward initialization tilt angle limit 336 can be defined from the maximum reverse tilt angle 322 and the maximum forward tilt angle 324 of the second step 320. For example, a minimum-sized reverse control sector (e.g., a flex angle) can define the minimum spacing between the maximum reverse tilt angle 322 and the reverse initialization tilt angle limit 334. A minimum-sized forward control sector (e.g., a flex angle) can define the minimum spacing between the maximum forward tilt angle 324 and the forward initialization tilt angle limit 336.

According to the third step 330, the mobile device 50 may prompt the user 40 to set the initialization tilt angle 332 by holding the mobile device 50 at a tilt angle 260 for a threshold period of time. If the tilt angle 260 is within the reverse initialization tilt angle limit 334 and the forward initialization tilt angle limit 336, the tilt angle 260 is set as the initialization tilt angle 332. If the tilt angle 260 is outside the zone defined by the reverse initialization tilt angle limit 334 and the forward initialization tilt angle limit 336, the initialization tilt angle 332 is not set and the user 40 will be notified by one or more feedback mechanisms such as visual, audible, or haptic feedback mechanisms.

The initialization tilt angle 332 may be stored for future use unless a new calibration is requested by the user 40. Alternatively, a new initialization tilt angle 332 may be established for each session.

Figure 7:
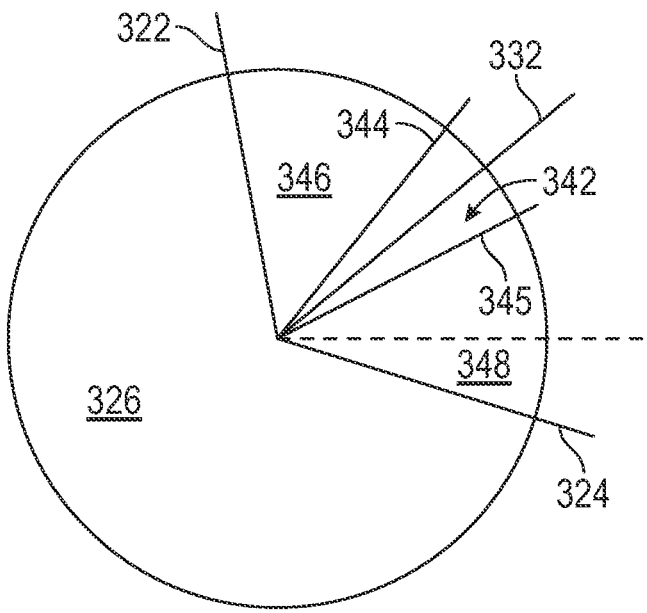
FIG. 7 is schematic illustration of the coordinate system of FIG. 5 with propulsion control input sectors in accordance with the present disclosure.

Once the initialization tilt angle 332 is set, according to a fourth step 340 and referring to FIG. 7, tilt angle control sectors for neutral, forward, and reverse control may be defined on the radial coordinate system.

For example, a neutral tilt angle control sector 342 may be defined by a range of tilt angles including the initialization tilt angle 332 (e.g., the initialization angle +/−10 degrees). The neutral tilt angle control sector 342 may be defined by a reverse-neutral border angle 344 and a forward-neutral border angle 345.

A reverse tilt angle control sector 346 may be defined by the reverse-neutral border angle 344 and the maximum reverse tilt angle 322. A forward tilt angle control sector 348 may be defined by the by the forward-neutral border angle 346 and the maximum forward tilt angle 324. In some examples, there are buffer zones between control sectors.

In examples where the directional input 240 is used, a single propulsion control sector may be defined for controlling the vehicle in the selected forward or reverse direction. Here, only one of the maximum reverse tilt angle 322 and a maximum forward tilt angle 324 may be established and the distance between the limits 334, 336 may be expanded.

The mobile device 50 generates a control signal 130 based on the tilt angle control sector 342, 346, 348 in which the tilt angle 260 is located. To provide a control input, the user 40 holds the mobile device 50 with both hands and contacts the engagement areas 220, 222 with the user's thumbs. While the user 40 contacts both of the engagement areas 220, 222, the mobile device 50 performs a control method.

For example, according to a fifth step 350, the mobile device 50 determines a tilt angle control sector 342, 346, 348 in which the tilt angle 260 is located, generates a control signal 130 based on the determined tilt angle control sector 342, 346, 348, and generates one or more control graphics to represent the tilt angle control sector 342, 346, 348 in which the tilt angle 260 is located on the user interface 60. Accordingly, the mobile device 50 can be rotated about the x-axis to control the forward and reverse movement of the vehicle 10.

The control signal 130 may indicate the direction, gear (e.g., neutral, reverse, first gear, second gear etc.), the speed, combinations thereof, and the like. For example, when the tilt angle 260 is located in the neutral tilt angle control sector 342, the control signal 130 is configured to instruct the vehicle 10 to place the vehicle 10 in park or place the vehicle 10 in neutral and apply the brake. When the tilt angle 260 is located in the reverse tilt angle control sector 346, the control signal 130 is configured to instruct the vehicle 10 to place the vehicle 10 in reverse and apply the accelerator and/or brake to maintain a speed. When the tilt angle 260 is located in the forward tilt angle control sector 348, the control signal 130 is configured to instruct the vehicle 10 to place the vehicle 10 in drive or a forward gear (e.g., first gear, second gear) and apply the accelerator or brake to maintain a speed.

If the user 40 releases contact from one or both of the engagement areas 220, 222, the mobile device 50 ends the control method and places the vehicle 10 in park.

The speed for a tilt angle control sector 346, 348 may be fixed or may be variable based on the tilt angle 260. For example, multiple speed sectors for each direction. Alternatively, the speed may be determined by the tilt angle 260 where increased speed is a function of increased distance of the tilt angle 260 from the initialization tilt angle 332.)

The speed may be a percentage of the maximum allowed vehicle speed. The maximum allowable vehicle speed may be determined by a level of autonomous operation (e.g., Level 2).

Figure 8:
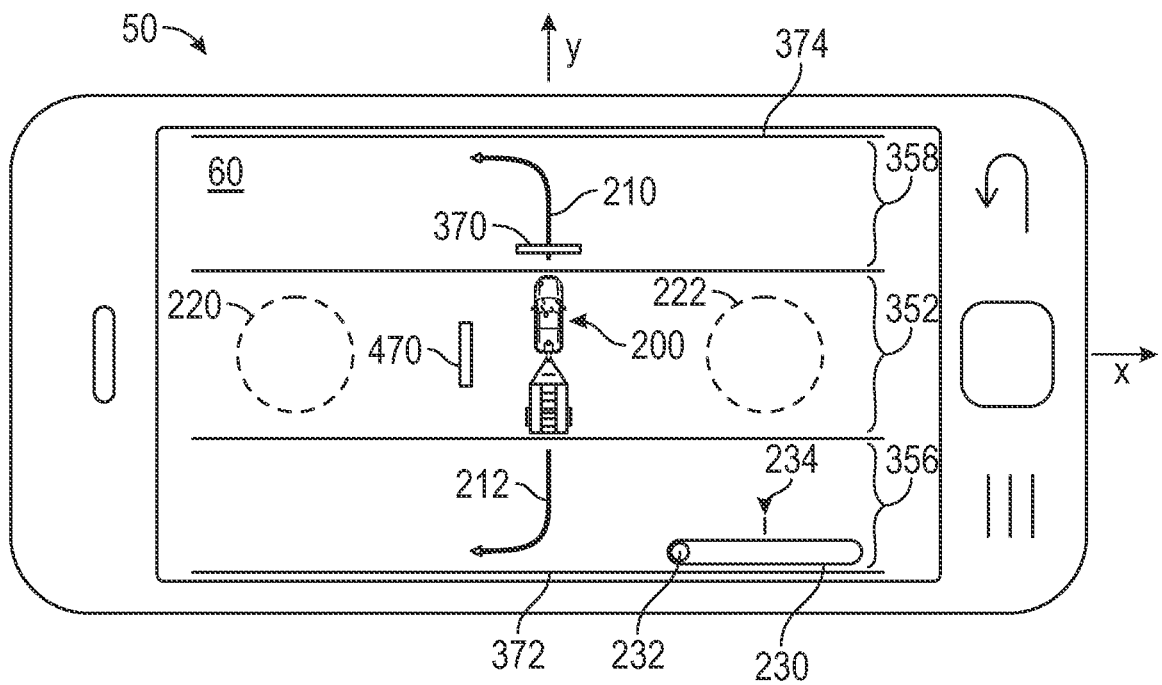
FIG. 8 is a schematic illustration of the mobile device of FIG. 2 with a user interface displaying the vehicle graphic and control graphics in accordance with the present disclosure.

Referring to FIG. 8, to provide feedback to the user 40 regarding the propulsion command control input, the user interface 60 may display areas 352, 356, 358 around the vehicle graphic 200 that correspond to the tilt angle control sectors 342, 346, 348. For example, the user interface 60 may display a forward area 358 at the front end and/or in front of the vehicle graphic 200, a neutral area 352 at the middle of the vehicle graphic 200, and a reverse area 356 at the back end or behind the vehicle graphic 200. The forward area 358 corresponds to the forward tilt angle control sector 348, the neutral area 352 corresponds to the neutral tilt angle control sector 342, and the reverse area 356 corresponds to the reverse tilt angle control sector 346.

The user interface 60 may also display a marker 370 that corresponds to the tilt angle 260. For example, the marker 370 moves along the y-axis (e.g. a longitudinal axis of the vehicle graphic 200) between limits 372, 374 in proportion to the location of the tilt angle 260 between the maximum forward tilt angle 324 and the maximum reverse angle 322. The forward limit 374 corresponds the maximum forward tilt angle 324 and the reverse limit 372 corresponds to the maximum reverse angle 322.

Control graphics provide feedback regarding which of the neutral, forward, or reverse control inputs is currently selected by the tilt angle 260 of the mobile device 50. Control graphics may highlight, color, or distinguish at least part of the areas 352, 356, 358, the vehicle graphic 200, and the path graphics 210, 212. Different colors may be used in different areas 352, 356, 358 to improve the feedback to the user 40.

For example, when the tilt angle 260 is located in the neutral tilt angle control sector 342, the control graphic includes highlighting and/or coloring the neutral area 352 and displaying the marker 370 in the neutral area 352. When the tilt angle 260 is located in the reverse tilt angle control sector 346, the control graphic includes highlighting and/or coloring the reverse area 356, highlighting and/or coloring the reverse path graphic 212, and displaying the marker 370 in the reverse area 356. When the tilt angle 260 is located in the forward tilt angle controls sector 348, the control graphic includes a highlighting and/or coloring the forward area 358, highlighting and/or coloring the forward path graphic 210, and displaying the marker 370 in the forward area 358.

The mobile device 50 may also generate a control graphic including highlighting and/or coloring the limits 372, 374 as the tilt angle 260 approaches the maximum reverse tilt angle 322 and the maximum forward tilt angle 324.

As described above, the path input 230 may be used to control the curvature of the path (i.e., path graphics 210, 212). The shape of the path may alternatively be controlled with the heading 270 as described in further detail below.

Figure 9:
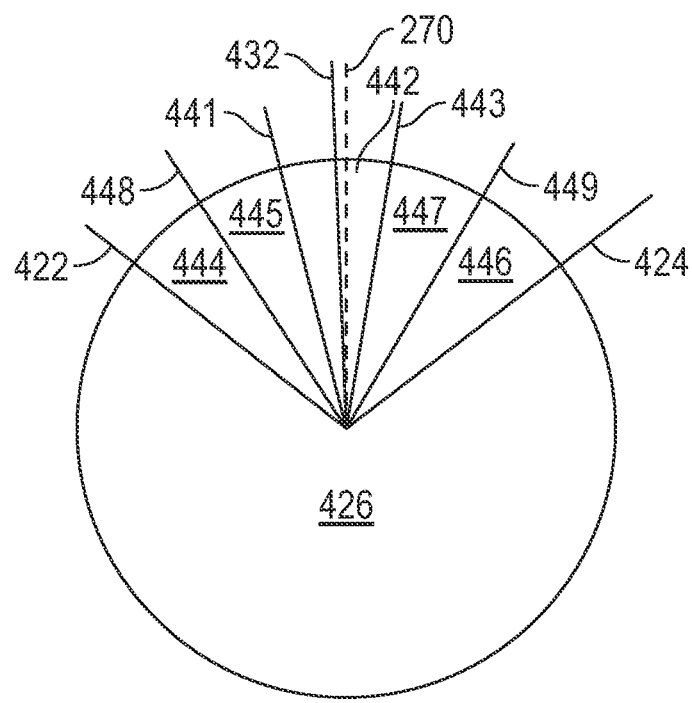
FIG. 9 is schematic illustration of a coordinate system of with steering control input sectors in accordance with the present disclosure.

Referring to FIG. 9, the heading 270 can be plotted on a horizontal radial coordinate system where the position of the magnetometer 74 defines the origin of the coordinate system.

Figure 10:
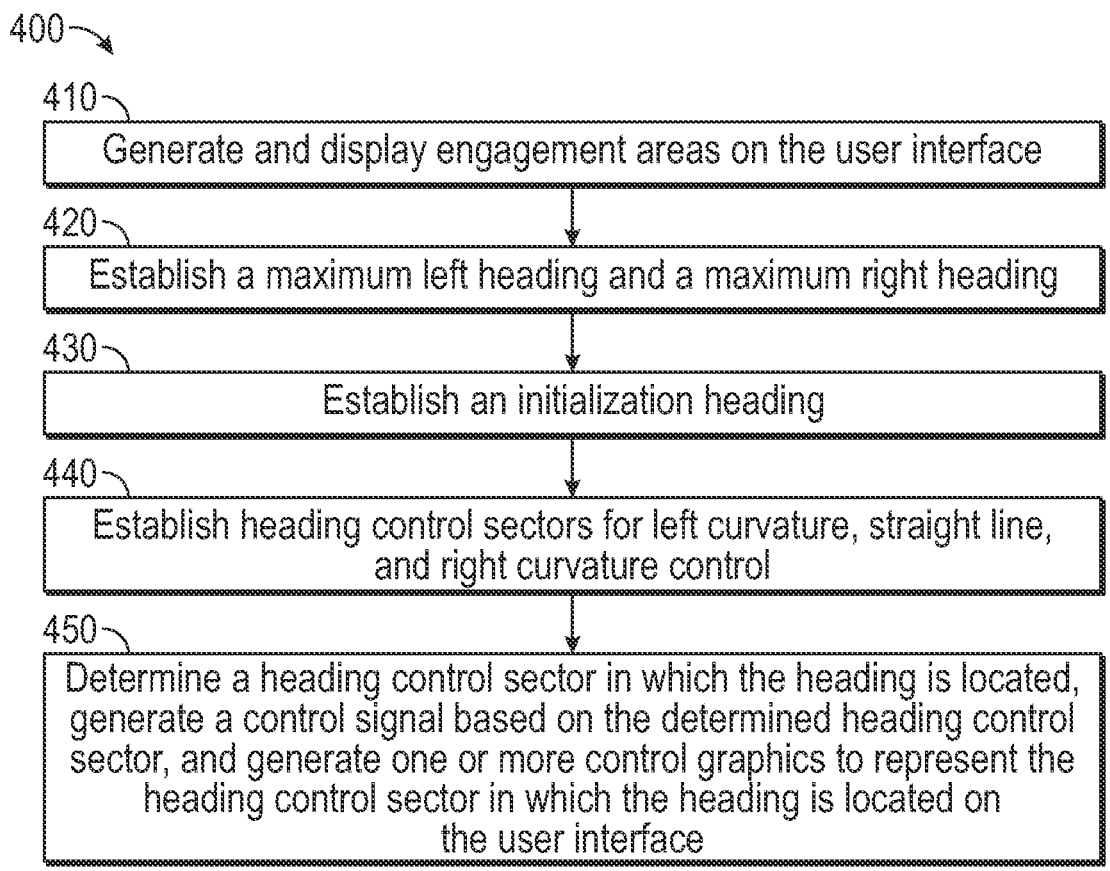
FIG. 10 is a flow chart of an example method in accordance with the present disclosure.

Referring to FIGS. 9 and 10, according to a method 400, the mobile device 50 may generate steering curvature control inputs that are customized for a user 40. Referring momentarily to FIG. 2, according to a first step 410, the mobile device 50 may generate and display two engagement areas 220, 222 on the user interface 60 (e.g., a touch-sensitive display). When the user 40 contacts both of the two engagement areas 220, 222, the mobile device 50 continues with additional steps of the method 400.

In some examples, according to a second step 420, the mobile device 50 prompts the user 40 to establish a maximum left heading 422 and a maximum right heading 424. For example, the mobile device 50 prompts the user 40 to rotate the mobile device 50 to the left around the y-axis as far as possible or as far as is comfortable to establish the maximum left heading 422. The mobile device 50 prompts the user 40 to rotate the mobile device to the right around the y-axis as far as possible or as far as is comfortable to establish the maximum right heading 424. In other examples, the maximum left heading 422 and the maximum right heading 424 are predetermined.

An inactive zone 426 may be defined between the maximum left heading 422 and the maximum right heading 424.

According to a third step 430, the mobile device 50 prompts the user 40 to establish an initialization heading 432. The initialization heading 432 is a heading 270 that is a straight-path control position where neither a left-curvature or right-curvature control command is generated. The initialization heading 432 may be established at a heading 270 that is comfortable to a particular user 40.

According to the third step 430, the mobile device may prompt the user 40 to set the initialization heading 432 by holding the mobile device 50 at a heading 270 for a certain period of time.

Once the initialization heading 432 is set, according to a fourth step 440, control sectors for left curvature, straight line, and right curvature control may be defined on the horizontal radial coordinate system.

For example, a straight line control sector 442 may be defined by a range of headings 270 including the initialization heading 432 (e.g., the initialization heading 432 +/–10 degrees). The straight line control sector 442 may be defined by border headings 441, 443.

Left curvature control sectors 444, 445 and right curvature control sectors 446, 447 may be defined by the by the maximum left heading 422, the maximum right heading 424, the border headings 441, 443, and border headings 448, 449. The left curvature control sectors 444, 445 are steering curvature control inputs for different amounts of left curvature and the right curvature control sectors 446, 447 are steering curvature control inputs for different amounts of right curvature.

In some examples, there are buffer zones between control sectors.

In other examples, there may be different numbers of left and/or right curvature sectors. In some examples, the curvature may increase based on the distance of the heading 270 from the initialization heading 432.

The mobile device 50 generates a control signal 130 based on the curvature control sector 442, 444, 445, 446, 447 in which the heading 270 is located. To provide a control input, the user 40 holds the mobile device 50 with both hands and contacts the engagement areas 220, 222 with the user's thumbs. While the user 40 contacts both of the engagement areas 220, 222, the mobile device 50 performs the control method.

For example, according to a fifth step 450, the mobile device 50 determines a curvature control sector 442, 444, 445, 446, 447 in which the heading 270 is located, generates a control signal 130 based on the determined curvature control sector 442, 444, 445, 446, 447 and generates one or more control graphics (e.g., path graphics 210, 212) to represent the curvature control sector 442, 444, 445, 446, 447 in which the heading 270 is located on the user interface 60. Accordingly, the mobile device 50 can be rotated about the y-axis to control the curvature of the path graphics 210, 212. The control signal 130 may indicate the steering angle, speed, combinations thereof, and the like.

If the user releases contact from one or both of the engagement areas 220, 222, the mobile device 50 ends the control method and places the vehicle 10 in park.

Referring to FIG. 8, to provide feedback to the user 40 regarding the steering curvature control input, the user interface 60 may display the path graphics 210, 212 with an amount of curvature that correspond to the curvature control sectors 442, 444, 445, 446, 447. The maximum curvature may be determined, for example, where a trailer angles is too large to maintain a constant curvature.

In addition, control graphics provide feedback regarding which of the straight-line, left-curved, or right-curved steering curvature control inputs is currently selected by the heading 270 of the mobile device 50. For example, control graphics may highlight, color, or distinguish the path graphics 210, 212. Different colors may be used for different curvature control sectors 442, 444, 445, 446, 447 to improve the feedback to the user 40.

For example, when the heading 270 is located in the first left curvature control sector 445, the control graphic includes highlighting and/or coloring the path graphics 210, 212 with a first color and, when the heading 270 is located in the second left curvature control sector 444, the control graphic includes highlighting and/or coloring the path graphics 210, 212 with a second color. Similarly, when the heading 270 is located in the first right curvature sector 447, the control graphic includes highlighting and/or coloring the path graphics 210, 212 with a first color and, when the heading 270 is located in the second right curvature control sector 446, the control graphic includes highlighting and/or coloring the path graphics 210, 212 with a second color. For example, the color may change as the heading 270 approaches the maximum left heading 422 or the maximum right heading 424.

The user interface 60 may also display a marker 470 that corresponds to the heading 270. For example, the marker 470 moves along the x-axis (e.g. orthogonal to the longitudinal axis of the vehicle graphic 200) in proportion to the location of the heading 270 between the maximum left heading 422 or the maximum right heading 424.

Referring to FIG. 11, vehicle systems are described in greater detail.

The server(s) 90 may be part of a cloud-based computing infrastructure, and may be associated with and/or include a Telematics Service Delivery Network (SDN) that provides digital data services to the vehicle 10 and other vehicles that may be part of a vehicle fleet.

The vehicle 10 includes a Vehicle Controls Unit (VCU) 600. The VCU 600 includes a plurality of electronic control units (ECUs) 610 disposed in communication with the automotive computer 80.

The VCU 600 may coordinate the data between vehicle systems, connected servers (e.g., the server(s) 90), and other vehicles operating as part of a vehicle fleet. The VCU 600 can include or communicate with any combination of the ECUs 610, such as, for example, a Body Control Module (BCM) 612, an Engine Control Module (ECM) 614, a Transmission Control Module (TCM) 616, a Telematics Control Unit (TCU) 618, a Restraint Control Module (RCM) 620, and the like.

The VCU 600 may control aspects of the vehicle 10, and implement one or more instruction sets received from the application 56 operating on the mobile device 50, and/or from instructions received from a vehicle system controller (such as vehicle system controller 110 described above).

The TCU 618 can be configured to provide vehicle connectivity to wireless computing systems onboard and offboard the vehicle 10 and is configurable for wireless communication between the vehicle 10 and other systems, computers, and modules. For example, the TCU 618 includes a Navigation (NAV) system 630 for receiving and processing a GPS signal from a GPS 632, a Bluetooth® Low-Energy Module (BLEM) 634, a Wi-Fi transceiver, an Ultra-Wide Band (UWB) transceiver, and/or other wireless transceivers.

The NAV system 630 may be configured and/or programmed to determine a position of the vehicle 10 and the trailer 30. The NAV system 630 may include a Global Positioning System (GPS) receiver configured or programmed to triangulate the position of the vehicle 10 relative to satellites or terrestrial based transmitter towers associated with the GPS 632. The NAV system 630, therefore, may be configured or programmed for wireless communication.

The NAV system 630 may be further configured or programmed to develop routes from a current location to a selected destination, as well as display a map and present driving directions to the selected destination via, e.g., the user interface 60. In some instances, the NAV system 630 may develop the route according to a user 40 preference. Examples of user 40 preferences may include maximizing fuel efficiency, reducing travel time, travelling the shortest distance, or the like.

The TCU 618 generally includes wireless transmission and communication hardware that may be disposed in communication with one or more transceivers associated with telecommunications towers and other wireless telecommunications infrastructure. For example, the BLEM 634 may be configured and/or programmed to receive messages from, and transmit messages to, one or more cellular towers associated with a telecommunication provider, and/or and a Telematics Service Delivery Network (SDN) associated with the vehicle 10 for coordinating vehicle fleet.

The TCU 618 may be disposed in communication with the ECUs 610 by way of a Controller Area Network (CAN) bus 640. In some aspects, the TCU 618 may retrieve data and send data as a CAN bus 640 node.

The BLEM 634 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 634 may include Generic Attribute Profile (GATT) device connectivity for client devices that respond to or initiate GATT commands and requests, and connect directly with the mobile device 50.

The CAN bus 640 may be configured as a multi-master serial bus standard for connecting two or more of the ECUs 610 as nodes using a message-based protocol that can be configured and/or programmed to allow the ECUs 610 to communicate with each other. The CAN bus 640 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 610 may communicate with a host computer (e.g., the automotive computer 80, the system 100, and/or the server(s) 90, etc.), and may also communicate with one another without the necessity of a host computer.

The CAN bus 640 may connect the ECUs 610 with the automotive computer 80 such that the automotive computer 80 may retrieve information from, send information to, and otherwise interact with the ECUs 610 to perform steps described according to embodiments of the present disclosure. The CAN bus 640 may connect CAN bus nodes (e.g., the ECUs 610) to each other through a two-wire bus, which may be a twisted pair having a nominal characteristic impedance. The CAN bus 640 may also be accomplished using other communication protocol solutions, such as Media Oriented Systems Transport (MOST) or Ethernet. In other aspects, the CAN bus 640 may be a wireless intra-vehicle CAN bus.

The VCU 600 may control various loads directly via the CAN bus 640 communication or implement such control in conjunction with the BCM 612. The ECUs 610 described with respect to the VCU 600 are provided for exemplary purposes only, and are not intended to be limiting or exclusive. Control and/or communication with other control modules is possible, and such control is contemplated.

The ECUs 610 may control aspects of vehicle operation and communication using inputs from human drivers, inputs from a vehicle system controller 110, the vehicle control system 100, and/or via wireless signal inputs received via wireless channel(s) 650 from other connected devices such as the mobile device 50, among others. The ECUs 610, when configured as nodes in the CAN bus 640, may each include a central processing unit (CPU), a CAN controller, and/or a transceiver. For example, although the mobile device 50 is depicted in FIG. 11 as connecting to the vehicle 10 via the BLEM 634, it is contemplated that the wireless connection may also or alternatively be established between the mobile device 50 and one or more of the ECUs 610 via the respective transceiver(s) associated with the module(s).

The BCM 612 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 612 may also operate as a gateway for bus and network interfaces to interact with remote ECUs.

The BCM 612 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 612 may be configured for vehicle energy management, exterior lighting control, wiper functionality, power window and door functionality, heating ventilation and air conditioning systems, and driver integration systems. In other aspects, the BCM 612 may control auxiliary equipment functionality, and/or is responsible for integration of such functionality. In one aspect, a vehicle having a vehicle control system 100 may integrate the system using, at least in part, the BCM 612.

The mobile device 50 may connect with the automotive computer 80 using wired and/or wireless communication protocols and transceivers. The mobile device 50 may be communicatively coupled with the vehicle 10 via one or more network(s) 652, which may communicate via one or more wireless channel(s) 650, and/or may connect with the vehicle 10 directly using near field communication (NFC) protocols, Bluetooth® protocols, Wi-Fi, Ultra-Wide Band (UWB), and other possible data connection and sharing techniques. The vehicle 10 may also receive and/or be in communication with the Global Positioning System (GPS) 632.

In some aspects, the mobile device 50 may communicate with the vehicle 10 through the one or more wireless channel(s) 650, which may be encrypted and established between the mobile device 50 and the Telematics Control Unit (TCU) 618. The mobile device 50 may communicate with the TCU 618 using a wireless transmitter associated with the TCU 618 on the vehicle 10. The transmitter may communicate with the mobile device 50 using a wireless communication network such as, for example, the one or more network(s) 652. The wireless channel(s) 650 are depicted in FIG. 11 as communicating via the one or more network(s) 652, and also via direct communication (e.g., channel 654) with the vehicle 10.

The network(s) 652 illustrate an example of an example communication infrastructure in which the connected devices discussed in various embodiments of this disclosure may communicate. The network(s) 652 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method for controlling a vehicle with a mobile device, comprising:
   setting a tilt angle of the mobile device as an initialization tilt angle; and
   defining a propulsion control input sector based on the initialization tilt angle, wherein the propulsion control input sector includes a range of tilt angles of the mobile device and is configured to generate a control signal for controlling a movement of the vehicle in a direction based on the tilt angle of the mobile device being in the propulsion control input sector.

2. The method of claim 1, wherein setting a tilt angle as the initialization tilt angle includes generating an engagement area on a user interface of the mobile device.

3. The method of claim 1, further comprising setting a tilt angle of the mobile device as a maximum reverse tilt angle and a maximum forward tilt angle.

4. The method of claim 3, wherein the propulsion control input sector is in between the initialization tilt angle and one of the maximum reverse tilt angle and the maximum forward tilt angle.

5. The method of claim 3, further comprising defining the range of tilt angles to which the initialization tilt angle is limited.

6. The method of claim 5, wherein the range of tilt angles to which the initialization tilt angle is limited is separated from at least one of the maximum reverse tilt angle and the maximum forward tilt angle by a minimum spacing.

7. The method of claim 1, wherein the propulsion control input sector includes a neutral tilt angle control sector that includes the initialization tilt angle.

8. The method of claim 7, wherein the propulsion control input sector includes at least one of a reverse tilt angle control sector and a forward tilt angle control sector that is separate from the neutral tilt angle control sector.

9. The method of claim 1, wherein the propulsion control input sector is configured to generate a control graphic if the tilt angle of the mobile device is in the propulsion control input sector.

10. The method of claim 1, comprising:
setting a heading of the mobile device as an initialization heading; and
defining a steering control input sector based on the initialization heading, wherein the steering control input sector includes a range of headings of the mobile device and is configured to generate a control signal for controlling a curvature of a path of the vehicle if the heading of the mobile device is in the propulsion control input sector.

11. The method of claim 10, further comprising setting a heading of the mobile device as a maximum left heading and a maximum right heading.

12. The method of claim 11, wherein the steering control input sector is in between the initialization heading and one of the maximum left heading and the maximum right heading.

13. The method of claim 12, wherein the steering control input sector includes a straight-line control sector that includes the initialization tilt angle.

14. The method of claim 13, wherein the steering control input sector includes a left-curvature control sector and a right curvature control sector.

15. The method of claim 10, wherein the steering control input sector is configured to generate a control graphic that includes a path graphic if the heading of the mobile device is in the steering control input sector.

16. The method of claim 1, comprising displaying at least one of a direction input and a path input.

17. A method for controlling a vehicle with a mobile device, comprising:
determining a tilt angle of the mobile device based on a measurement from an inertial sensor;
determining a propulsion control input sector in which the tilt angle is located, wherein the propulsion control input sector includes a range of tilt angles;
generating a control signal for controlling a movement of the vehicle if the tilt angle of the mobile device is in the propulsion control input sector; and
displaying a control graphic on a user interface of the mobile device if the tilt angle of the mobile device is in the determined propulsion control input sector, wherein the control graphic is displayed relative to a vehicle graphic in correspondence with a direction of movement.

18. The method of claim 17, the propulsion control input sector comprising a neutral control input sector, a reverse control input sector, and a forward control input sector; and a control graphic being configured to be displayed in a middle of the vehicle graphic, behind the vehicle graphic, and above the vehicle graphic.

19. The method of claim 17, comprising displaying at least one of a direction input and a path input.

20. The method of claim 17, comprising displaying an engagement area on the user interface of the mobile device.

* * * * *